United States Patent
Hashimoto

(10) Patent No.: US 7,146,426 B2
(45) Date of Patent: Dec. 5, 2006

(54) NETWORK SYSTEM, SERVER, CLIENTS, COMMUNICATION METHOD, AND COMMUNICATION COMPUTER PROGRAM PRODUCT

(75) Inventor: Kohji Hashimoto, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 709 days.

(21) Appl. No.: 10/076,379

(22) Filed: Feb. 14, 2002

(65) Prior Publication Data

US 2002/0116515 A1 Aug. 22, 2002

(30) Foreign Application Priority Data

Feb. 20, 2001 (JP) ............................. 2001-044161

(51) Int. Cl.
*G06F 15/16* (2006.01)
*G08C 25/02* (2006.01)
(52) U.S. Cl. ...................... 709/237; 709/224; 709/245; 714/748
(58) Field of Classification Search ................ 709/203, 709/206, 231, 245, 204, 219, 228, 224, 237; 714/18, 748, 749
See application file for complete search history.

(56) References Cited

U.S. PATENT DOCUMENTS

| | | | | |
|---|---|---|---|---|
| 5,297,143 A | * | 3/1994 | Fridrich et al. ............. | 370/445 |
| 5,432,798 A | * | 7/1995 | Blair ........................... | 714/748 |
| 5,570,367 A | * | 10/1996 | Ayanoglu et al. ........... | 370/346 |
| 6,151,696 A | * | 11/2000 | Miller et al. ................ | 714/748 |
| 6,392,993 B1 | * | 5/2002 | Hamilton et al. ........... | 370/230 |
| 6,567,929 B1 | * | 5/2003 | Bhagavath et al. .......... | 714/18 |
| 6,629,149 B1 | * | 9/2003 | Fraser et al. ................ | 709/245 |
| 6,745,360 B1 | * | 6/2004 | Srinivas et al. ............. | 714/748 |
| 6,782,490 B1 | * | 8/2004 | Maxemchuk et al. ......... | 714/18 |

FOREIGN PATENT DOCUMENTS

| | | |
|---|---|---|
| JP | 10-341246 | 12/1998 |
| JP | 11-074829 | 3/1999 |
| JP | 11-196041 | 7/1999 |
| JP | 11-340991 | 12/1999 |
| JP | 2000-115051 | 4/2000 |

OTHER PUBLICATIONS

Barcellos, M. et al. "An End-to-End Reliable Multicast Protocol Using Polling for Scaleability" IEEE INFOCOM, pp. 1180-1187, San Francisco, Apr. 1998.*

Technical Report IEICE, "The Present Condition and Trend of A Reliable Multicast Technology", S. Kinoshita, Shingakugihou, Pub. Co., IN2000-20.

\* cited by examiner

*Primary Examiner*—Saleh Najjar
*Assistant Examiner*—David Lazaro
(74) *Attorney, Agent, or Firm*—David A. Mims, Jr.

(57) ABSTRACT

To ensure the polling of a server 11 will reach clients 12 from which an ACK/NACK has not been received despite the change of IP addresses of clients 12 in a network system where an ACK/NACK is to be sent back from each client 12 to the server 11 after file data is transmitted from the server 11 to multiple clients 12 by means of broadcast.

Clients 12 in a group are granted identification IDs that are mutually identifiable and permanent. Server 11 send the polling by means of multicast that contains information about permanent IDs of the clients 12 from which it has not received an ACK/NACK. Each of the clients 12 replies with an ACK/NACK if its own permanent ID is contained in the polling, otherwise makes no reply.

8 Claims, 10 Drawing Sheets

| 0 | | 16 | 24 | 31 |
|---|---|---|---|---|
| PACKET CLASS (EXTENSION 2) || PACKET LENGTH |||
| CONNECTION ID || NUMBER OF RETRANSMISSION | NAME TYPE ||
| MESSAGE ID || RESERVATION |||
| NAME ID |||||

FIG. 7

| 0 | | 16 | 24 | 31 |
|---|---|---|---|---|
| PACKET CLASS (EXTENSION 3) || PACKET LENGTH |||
| CONNECTION ID || NUMBER OF RETRANSMISSION | NAME TYPE ||
| MESSAGE ID || RESERVATION |||
| NAME ID |||||
| CONSECUTIVE DESCRIPTION OF SEQUENCE NUMBERS (16 BITS) OF DATA PACKETS TO BE RETRANSMITTED |||||

FIG. 8

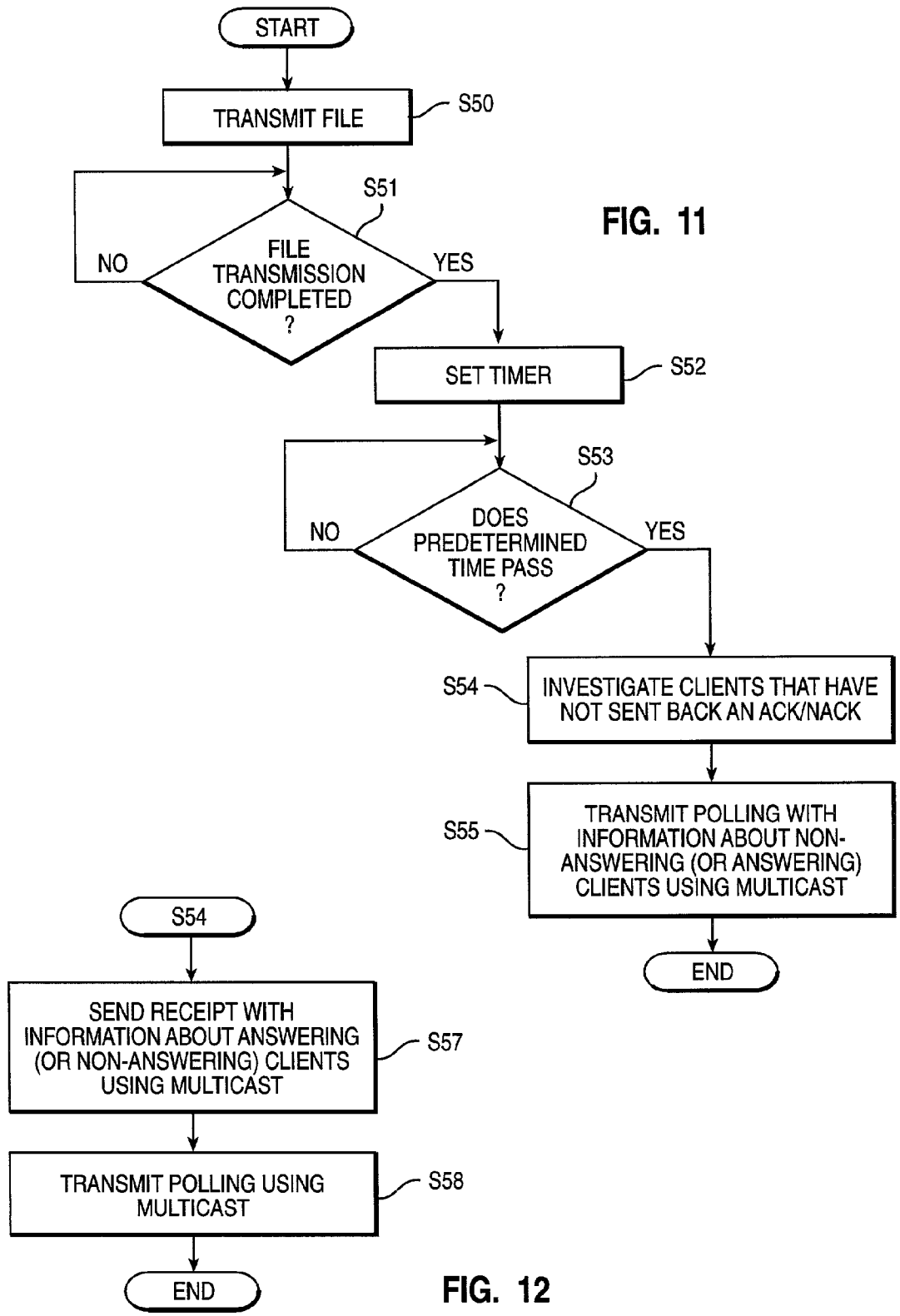

NETWORK SYSTEM, SERVER, CLIENTS, COMMUNICATION METHOD, AND COMMUNICATION COMPUTER PROGRAM PRODUCT

DETAILED DESCRIPTION OF THE INVENTION

1. Field of the Invention

The present invention relates to a network system, server, client, communication method for a network, communication method for a server, communication method for clients, communication computer program product for a network, communication computer program product for a server, and communication computer program product for clients, which deliver data to multiple hosts using the multicast, and more particularly to a network system, server, clients, communication method for a network, communication method for a server, communication computer program product for clients, communication computer program product for a server, and communication computer program product for clients, which ensure polling to target clients in spite of the change of their dynamic addresses such as IP addresses.

2. Background Art

In the well-known RMTP (Reliable Multicast Transport Protocol), each client sends to a server an ACK (acknowledge) packet indicating a successful receipt or a NACK (negative acknowledge) packet indicating an unsuccessful receipt by means of unicast when the client ends the communication of one file with the server in order to ensure the reliability of multi-destination delivery of data from the server to all the clients in a predetermined group. A file sent from the server to the clients is divided into multiple data packets to be transmitted, wherein the NACK packet contains information indicating which data packet has not been received appropriately. Therefore, the server resends the data packets collectively that have caused an error at any client by means of multicast and repeats the receipt of such an ACK and NACK and retransmission to ensure the transmission of files to each client.

PROBLEMS TO BE SOLVED BY THE INVENTION

However, some ACKs and NACKs might be lost on the way of the Internet, thereby not reaching the server. Therefore, the server performs polling to the clients from which it has received neither an ACK nor NACK. However, in the DHCP (Dynamic Host Configuration Protocol), an IP address of each client is dynamic, thus it might occur that the polling is not transmitted from the server to the clients subject to polling.

Japanese Unexamined Patent Publication No. 1999-355303 utilizes an ARP (Address Resolution Protocol) table where the correspondence between hardware addresses and IP addresses are registered, wherein the server determines a hardware address of each client using an IP address contained in the communication signal sent from the client together with the ARP table and acquires a pseudo physical device ID uniquely corresponding to that hardware address from a pseudo physical device ID table. According to the technique described in this patent publication, the server can not determine the pseudo physical device ID of the client without receiving the communication signal from the client. Namely, the technique described in the above patent publication is applicable to the pull-type information extraction, however, as in the push-type information transmission, a current IP address of the client is not known, thus the pseudo physical device ID of the client can not be detected, consequently resulting in no use for the push-type information transmission.

It is therefor an object of the present invention to provide a network system, server, clients, communication method for a network, communication method for a server, communication method for clients, communication computer program product for a network, communication computer program product for a server, and communication computer program product for clients, which ensure polling from a server to target clients in spite of the change of their dynamic addresses. It is another object of the invention to provide a network system, server, clients, communication method for a network, communication method for a server, communication method for clients, communication computer program product for a network, communication computer program product for a server, and communication computer program product for clients, which implements polling functions that avoid retransmission of an ACK/NACK by the clients from which the server has already received an ACK/NACK, while ensuring the reply of an ACK/NACK by the clients from which the server has not received an ACK/NACK, thereby preventing the increase of the traffic due to a number of ACKs/NACKs. It is a further object of the invention to provide clients, a communication method for clients, and a communication computer program product for clients, wherein a client that receives polling from a server due to its non-receipt of an ACK/NACK can reply to the server with correctly identifying client itself despite the change of its own dynamic address when replying to the server.

SUMMARY OF THE INVENTION

In a first aspect of the present invention, there is provided a network system that supports unicast as a communication scheme from a server to one client in a network, multicast as a communication scheme from the server to all the clients in a predetermined group, and broadcast as a communication scheme from the server to all the clients in the network, wherein the server comprises:

a permanent ID information storage section for storing permanent IDs of each of the clients, wherein each of the clients is granted a permanent ID that is mutually identifiable and permanent; and a polling transmission section for transmitting a packet for polling to the clients by means of broadcast or multicast, wherein the packet contains information about the permanent IDs of the clients that need or need not reply to the polling, and wherein the client comprises:

a permanent ID information storage section for storing its own permanent ID information;

a determination section for determining whether or not to reply based on whether its own permanent ID is contained in the packet for polling that has been received by means of broadcast or multicast; and a reply section for replying or not replying to the server based on the determination made by the determination section.

A dynamic address is an IP address, for example. AS is commonly known in the art, IP addresses are granted to a server and clients that are connected to a network and in an operational state as an address for mutual identification. Unicast, multicast and broadcast are defined by UDP (user datagram protocol) of the transport layer of the OSI (open systems interconnection) reference standard. As is well known in the art, for UDP, unicast uses an IP address as it is as a destination of packets, while broadcast and multicast use a shared address as a destination address, which is generated by changing the specific part of dynamic addresses of multiple clients to the same predetermined content.

A permanent ID (ID means an identifier) granted to each client that is mutually identifiable and permanent is defined, for example, when a user of each client becomes a member. The permanent ID is represented by text such as characters and numerals, which can be described in a packet.

A polling packet requiring a reply and a polling packet requiring no reply can be appropriately created, for example, by the definition of classes of a header of packets. Furthermore, a permanent ID can be appropriately described in a user data part of the polling packet. As there is a limit to a maximum size of one packet, so when all the permanent IDs can not be described in the user data part of one polling packet, they are divided to be carried by multiple polling packets. Since the polling packet is transmitted from the server by means of broadcast or multicast, it will reach the clients subject to and non-subject to polling.

In a network system where a server transmits the polling requiring a reply, a client will reply to the polling packet received when its own permanent ID is contained therein, otherwise the client will not reply. In this way, the server can receive a reply to the polling from the clients subject to polling.

On the contrary, in a network system where a server transmits the polling requiring no reply, a client does not reply when its own permanent ID is contained in the polling packet received, otherwise the client replies. In this way, the server can receive a reply to the polling from the clients subject to polling.

As is evident from the above, while in a network system where dynamic addresses are specified as a destination of packets, the polling may not be transmitted to target clients because of the changes of the dynamic addresses, the present invention ensures that the server sends polling to clients subject to polling and then the clients subject to polling send a reply to the server.

It should be noted that in the first aspect as well as in the third, fifth, seventh, ninth and eleventh aspects of the present invention described below, the polling may not be limited to that which is associated with non-receipt at the server of an ACK or NACK from the clients in response to transmission of file data from the server to the clients.

In a second aspect of the present invention, there is provided the network system according to the first aspect, wherein the polling is associated with non-receipt at the server of an ACK or NACK from the clients in response to transmission of file data from the server to the clients.

In a third aspect of the present invention, there is provided a server in a network system that supports unicast as a communication scheme from the server to one client in a network, multicast as a communication scheme from the server to all the clients in a predetermined group, and broadcast as a communication scheme from the server to all the clients in the network, wherein the server comprises:

a permanent ID information storage section for storing permanent IDs of each of the clients, wherein each of the clients is granted a permanent ID that is mutually identifiable and permanent; and a polling transmission section for transmitting a packet for polling to the clients by means of broadcast or multicast, wherein the packet contains information about the permanent IDs of the clients that need or need not reply to the polling.

In a fourth aspect of the present invention, there is provided the server according to the third aspect, wherein the polling is associated with non-receipt at the server of an ACK or NACK from the clients in response to transmission of file data from the server to the clients.

In a fifth aspect of the present invention, there is provided a client in a network system that supports unicast as a communication scheme from a server to one client in a network, multicast as a communication scheme from the server to all the clients in a predetermined group, and broadcast as a communication scheme from the server to all the clients in the network, wherein the client comprises:

a permanent ID information storage section for storing its own permanent ID information, wherein each of the clients is granted a permanent ID that is mutually identifiable and permanent;

a determination section for determining whether or not to reply based on whether its own permanent ID is contained in the packet for polling that has been received by means of broadcast or multicast; and a reply section for replying or not replying to the server based on the determination made by the determination section.

In a sixth aspect of the present invention, there is provided the client according to the fifth aspect, wherein the polling is associated with non-receipt at the server of an ACK or NACK from the clients in response to transmission of file data from the server to the clients, and wherein the reply section puts its client's own permanent ID information in a reply packet to the server.

When a client receives the polling from the server concerning the non-receipt of an ACK/NACK and replies to the polling, the server can not recognize from information contained in the packet header which client has sent that reply, due to the change of a dynamic address of the client.

However, according to the present invention, a permanent ID of the client itself is contained in a reply packet from the client, whereby the server can accurately recognize which client has sent the reply by reading that information.

In a seventh aspect of the present invention, there is provided a network system that supports unicast as a communication scheme from a server to one client in a network, multicast as a communication scheme from the server to all the clients in a predetermined group, and broadcast as a communication scheme from the server to all the clients in the network, wherein the server comprises:

a permanent ID information storage section for storing permanent IDs of each of the clients, wherein each of the clients is granted a permanent ID that is mutually identifiable and permanent;

a notification of information transmission section for transmitting a packet for notification of information to the clients by means of broadcast or multicast, wherein the packet contains information about the permanent IDs of the clients that need or need not reply to a polling packet sent afterward; and a polling transmission section for transmitting a packet for polling to the clients by means of broadcast or multicast after the notification of information transmission section transmits the packet for notification of information, and wherein the client comprises:

a permanent ID information storage section for storing its own permanent ID information;

a determination section for determining whether or not to reply to the polling afterward based on whether its own permanent ID is contained in the packet for notification of information that has been received by means of broadcast or multicast; and a reply section for replying or not replying to the server in response to the packet for polling received by means of broadcast or multicast based on the determination made by the determination section after receipt of the packet of the notification of information.

A packet for notification of information that requires a reply to polling and a packet for notification of information that requires no reply to polling can be appropriately created, for example, by the definition of classes of a header of packets. Furthermore, a permanent ID can be appropriately described in a user data part of the packet for notification of information. As there is a limit to a maximum size of one packet, so when all the permanent IDs can not be described in the user data part of one packet for notification of information, they are divided to be carried by multiple packets for notification of information.

Since the packet for notification of information and the subsequent polling packet are transmitted from the server by means of broadcast or multicast, they will reach the clients subject to and non-subject to polling.

In a network system where a server transmits the notification of information requiring a reply, a client will reply to the polling received afterward when its own permanent ID is contained in the received packet for notification of information, otherwise the client will not reply. In this way, the server can receive a reply to the polling from the clients subject to polling.

On the contrary, in a network system where a server transmits the notification of information requiring no reply, a client will not reply to the polling received afterward when its own permanent ID is contained in the received packet for notification of information, otherwise the client will reply. In this way, the server can receive a reply to the polling from the clients subject to polling.

As is evident from the above, while in a network system where dynamic addresses are specified as a destination of packets, the polling may not be transmitted to target clients because of the changes of the dynamic addresses, the present invention ensures that the server sends polling to clients subject to polling and then the clients subject to polling send a reply to the server.

In an eighth aspect of the present invention, there is provided the network system according to the seventh aspect, wherein the notification of information is associated with receipt or non-receipt at the server of an ACK or NACK from the clients in response to transmission of file data from the server to the clients, and wherein the polling is associated with non-receipt at the server of an ACK or NACK from the clients in response to the transmission of the file data from the server to the clients.

In a ninth aspect of the present invention, there is provided a server in a network system that supports unicast as a communication scheme from a server to one client in a network, multicast as a communication scheme from the server to all the clients in a predetermined group, and broadcast as a communication scheme from the server to all the clients in the network, wherein the server comprises:

a permanent ID information storage section for storing permanent IDs of each of the clients, wherein each of the clients is granted a permanent ID that is mutually identifiable and permanent;

a notification of information transmission section for transmitting a packet for notification of information to the clients by means of broadcast or multicast, wherein the packet contains information about the permanent IDs of the clients that need or need not reply to a polling packet sent afterward; and a polling transmission section for transmitting a packet for polling to the clients by means of broadcast or multicast after the notification of information transmission section transmits the packet for notification of information.

In a tenth aspect of the present invention, there is provided the server according to the ninth aspect, wherein the notification of information is associated with receipt or non-receipt at the server of an ACK or NACK from the clients in response to transmission of file data from the server to the clients, and wherein the polling is associated with non-receipt at the server of an ACK or NACK from the clients in response to the transmission of the file data from the server to the clients.

In an eleventh aspect of the present invention, there is provided a client in a network system that supports unicast as a communication scheme from a server to one client in a network, multicast as a communication scheme from the server to all the clients in a predetermined group, and broadcast as a communication scheme from the server to all the clients in the network, wherein the client comprises:

a permanent ID information storage section for storing its own permanent ID information, wherein each of the clients is granted a permanent ID that is mutually identifiable and permanent;

a determination section for determining whether or not to reply to the polling afterward based on whether its own permanent ID is contained in a packet for notification of information that has been received by means of broadcast or multicast; and a reply section for replying or not replying to the server in response to a packet for polling received by means of broadcast or multicast based on the determination made by the determination section after receipt of the packet of the notification of information.

In a twelfth aspect of the present invention, there is provided the client according to the eleventh aspect, wherein the notification of information is associated with receipt or non-receipt at the server of an ACK or NACK from the clients in response to transmission of file data from the server to the clients, and wherein the polling is associated with non-receipt at the server of an ACK or NACK from the clients in response to the transmission of the file data from the server to the clients, and wherein the reply section puts its client's own permanent ID information in a reply packet to the server.

In a thirteenth aspect of the present invention, there is provided a network system that supports unicast as a communication scheme from a server to one client in a network, multicast as a communication scheme from the server to all the clients in a predetermined group, and broadcast as a communication scheme from the server to all the clients in the network, wherein the server comprises:

a permanent ID information storage section for storing permanent IDs of each of the clients, wherein each of the clients is granted a permanent ID that is mutually identifiable and permanent;

a polling transmission section for polling the clients from which an ACK or NACK has not been received after file data was transmitted to the clients by means of broadcast or multicast, wherein in a polling mode with non-receipt information, a packet for polling itself or notification of information prior to the polling is transmitted to the network by means of broadcast or multicast, wherein the packet contains permanent IDs of the clients that need reply to the polling, whereas in a polling mode with receipt information, a packet for polling itself or notification of information prior to the polling is transmitted to the network by means of broadcast or multicast, wherein the packet contains permanent IDs of the clients that need not reply to the polling;

a detection section for detecting a number N of clients from which an ACK or NACK has not been received in response to the transmission of the file data from the server to the clients by means of broadcast or multicast; and a switching section for switching between the polling mode with non-receipt information and the polling mode with receipt information in the polling transmission section based on the number N, and wherein the client comprises:

a permanent ID information storage section for storing its own permanent ID information;

a determination section for determining whether or not to reply to the polling based on whether its own permanent ID is contained in the packet for polling itself or notification of information prior to the polling that has been received by means of broadcast or multicast; and a reply section for replying or not replying to the server in response to the packet for polling received by means of broadcast or multicast based on the determination made by the determination section.

In a polling mode with non-receipt information, two cases are considered, that is, (a) a packet for polling itself, which contains permanent IDs of the clients that need reply to the polling, is transmitted by means of broadcast or multicast, and (b) first a packet for notification of information, which contains permanent IDs of the clients that need reply to the polling, is transmitted by means of broadcast or multicast, then a packet for polling is transmitted is transmitted by means of broadcast or multicast. On the other hand, in a polling mode with receipt information, the following two cases are considered, that is, (c) a packet for polling itself, which contains permanent IDs of the clients that need not reply to the polling, is transmitted by means of broadcast or multicast, and (d) first a packet for notification of information, which contains permanent IDs of the clients that need not reply to the polling, is transmitted by means of broadcast or multicast, then a packet for polling is transmitted is transmitted by means of broadcast or multicast. Namely, the switching section described above switches between (a) and (b) or between (c) and (d).

The switching section of the server determines which is more advantageous the polling mode with non-receipt information or the polling mode with receipt information based on the number of N, and switches to the one selected.

In a fourteenth aspect of the present invention, there is provided the network system according to the thirteenth aspect, wherein the switching section determines, based on N, which makes the number of packets to be transmitted smaller, the polling mode with non-receipt information or the polling mode with receipt information, and based on the determination switches between the polling mode with non-receipt information and the polling mode with receipt information in the polling transmission section.

Owing to such switching, the traffic in the network can be reduced and the time required to transmit the whole traffic can be reduced as well.

In a fifteenth aspect of the present invention, there is provided a server in a network system that supports unicast as a communication scheme from a server to one client in a network, multicast as a communication scheme from the server to all the clients in a predetermined group, and broadcast as a communication scheme from the server to all the clients in the network, comprising:

a permanent ID information storage section for storing permanent IDs of each of the clients, wherein each of the clients is granted a permanent ID that is mutually identifiable and permanent;

a polling transmission section for polling the clients from which an ACK or NACK has not been received after file data was transmitted to the clients by means of broadcast or multicast, wherein in a polling mode with non-receipt information, a packet for polling itself or notification of information prior to the polling is transmitted to the network by means of broadcast or multicast, wherein the packet contains permanent IDs of the clients that need reply to the polling, whereas in a polling mode with receipt information, a packet for polling itself or notification of information prior to the polling is transmitted to the network by means of broadcast or multicast, wherein the packet contains permanent IDs of the clients that need not reply to the polling;

a detection section for detecting a number N of clients from which an ACK or NACK has not been received in response to the transmission of the file data from the server to the clients by means of broadcast or multicast; and a switching section for switching between the polling mode with non-receipt information and the polling mode with receipt information in the polling transmission section based on the number N.

In a sixteenth aspect of the present invention, there is provided the server according to the fifteenth aspect, wherein the switching section determines, based on N, which makes the number of packets to be transmitted smaller, the polling mode with non-receipt information or the polling mode with receipt information, and based on the determination switches between the polling mode with non-receipt information and the polling mode with receipt information in the polling transmission section.

In a seventeenth aspect of the present invention, there is provided a client in a network system that supports unicast as a communication scheme from a server to one client in a network, multicast as a communication scheme from the server to all the clients in a predetermined group, and broadcast as a communication scheme from the server to all the clients in the network, wherein the client comprises:

a permanent ID information storage section for storing its own permanent ID information;

a determination section for determining whether or not to reply to the polling based on whether its own permanent ID is contained in the packet for polling itself or notification of information prior to the polling that has been received by means of broadcast or multicast; and a reply section for replying or not replying to the server in response to the packet for polling received by means of broadcast or multicast based on the determination made by the determination section.

In an eighteenth aspect of the present invention, there is provided a communication method for a network system that supports unicast as a communication scheme from a server to one client in a network, multicast as a communication scheme from the server to all the clients in a predetermined group, and broadcast as a communication scheme from the server to all the clients in the network, wherein the server performs the steps of:

storing permanent IDs of each of the clients, wherein each of the clients is granted a permanent ID that is mutually identifiable and permanent; and transmitting a packet for polling to the clients by means of broadcast or multicast, wherein the packet contains information about the permanent IDs of the clients that need or need not reply to the polling, and wherein the client performs the steps of:

storing its own permanent ID information;

determining whether or not to reply based on whether its own permanent ID is contained in the packet for polling that has been received by means of broadcast or multicast; and replying or not replying to the server based on the determination.

Preferably, in the communication method for the network system according to the eighteenth aspect, the polling is associated with non-receipt at the server of an ACK or NACK from the clients in response to transmission of file data from the server to the clients.

In a nineteenth aspect of the present invention, there is provided a communication method for a server in a network system that supports unicast as a communication scheme from the server to one client in a network, multicast as a communication scheme from the server to all the clients in a predetermined group, and broadcast as a communication scheme from the server to all the clients in the network, wherein the method comprises the steps of:

storing permanent IDs of each of the clients, wherein each of the clients is granted a permanent ID that is mutually identifiable and permanent; and transmitting a packet for polling to the clients by means of broadcast or multicast, wherein the packet contains information about the permanent IDs of the clients that need or need not reply to the polling.

Preferably, in the communication method for the server according to the nineteenth aspect, the polling is associated with non-receipt at the server of an ACK or NACK from the clients in response to transmission of file data from the server to the clients.

In a twentieth aspect of the present invention, there is provided a communication method for clients in a network system that supports unicast as a communication scheme from a server to one client in a network, multicast as a communication scheme from the server to all the clients in a predetermined group, and broadcast as a communication scheme from the server to all the clients in the network, wherein the method comprises the steps of:

storing its own permanent ID information, wherein each of the clients is granted a permanent ID that is mutually identifiable and permanent;

determining whether or not to reply based on whether its own permanent ID is contained in the packet for polling that has been received by means of broadcast or multicast; and replying or not replying to the server based on the determination.

Preferably, in the communication method for clients according to the twentieth aspect, the polling is associated with non-receipt at the server of an ACK or NACK from the clients in response to transmission of file data from the server to the clients, and when it is determined to reply, the client's own permanent ID information is to be put in a reply packet to the server.

In a twenty-first aspect of the present invention, there is provided a communication method for a network system that supports unicast as a communication scheme from a server to one client in a network, multicast as a communication scheme from the server to all the clients in a predetermined group, and broadcast as a communication scheme from the server to all the clients in the network, wherein the server performs the steps of:

storing permanent IDs of each of the clients, wherein each of the clients is granted a permanent ID that is mutually identifiable and permanent;

transmitting a packet for notification of information to the clients by means of broadcast or multicast, wherein the packet contains information about the permanent IDs of the clients that need or need not reply to a polling packet sent afterward; and transmitting a packet for polling to the clients by means of broadcast or multicast after having transmitted the packet for notification of information, and wherein the client performs the steps of:

storing its own permanent ID information;

determining whether or not to reply to the polling afterward based on whether its own permanent ID is contained in the packet for notification of information that has been received by means of broadcast or multicast; and based on the determination, replying or not replying to the server in response to the packet for polling received by means of broadcast or multicast after receipt of the packet of the notification of information.

Preferably, in the communication method for the network system according to the twenty-first aspect, the notification of information is associated with receipt or non-receipt at the server of an ACK or NACK from the clients in response to transmission of file data from the server to the clients, while the polling is associated with non-receipt at the server of an ACK or NACK from the clients in response to the transmission of the file data from the server to the clients.

In a twenty-second aspect of the present invention, there is provided a communication method for a server in a network system that supports unicast as a communication scheme from a server to one client in a network, multicast as a communication scheme from the server to all the clients in a predetermined group, and broadcast as a communication scheme from the server to all the clients in the network, wherein the method comprises:

storing permanent IDs of each of the clients, wherein each of the clients is granted a permanent ID that is mutually identifiable and permanent;

transmitting a packet for notification of information to the clients by means of broadcast or multicast, wherein the packet contains information about the permanent IDs of the clients that need or need not reply to a polling packet sent afterward; and transmitting a packet for polling to the clients by means of broadcast or multicast after having transmitted the packet for notification of information.

Preferably, in the communication method for the server according to the twenty-second aspect, the notification of information is associated with receipt or non-receipt at the server of an ACK or NACK from the clients in response to transmission of file data from the server to the clients, while the polling is associated with non-receipt at the server of an ACK or NACK from the clients in response to the transmission of the file data from the server to the clients.

In a twenty-third aspect of the present invention, there is provided a communication method for clients in a network system that supports unicast as a communication scheme from a server to one client in a network, multicast as a communication scheme from the server to all the clients in a predetermined group, and broadcast as a communication scheme from the server to all the clients in the network, wherein the method comprises the steps of:

storing its own permanent ID information, wherein each of the clients is granted a permanent ID that is mutually identifiable and permanent;

determining whether or not to reply to the polling afterward based on whether its own permanent ID is contained in a packet for notification of information that has been received by means of broadcast or multicast; and based on the determination, replying or not replying to the server in response to a packet for polling received by means of broadcast or multicast after receipt of the packet of the notification of information.

Preferably, in the communication method for clients according to the twenty-third aspect, the notification of information is associated with receipt or non-receipt at the server of an ACK or NACK from the clients in response to transmission of file data from the server to the clients, while the polling is associated with non-receipt at the server of an ACK or NACK from the clients in response to the transmission of the file data from the server to the clients, and when it is determined to reply, the client's own permanent ID information is to be put in a reply packet to the server.

In a twenty-fourth aspect of the present invention, there is provided a communication method for a network system that supports unicast as a communication scheme from a server to one client in a network, multicast as a communication scheme from the server to all the clients in a predetermined group, and broadcast as a communication scheme from the server to all the clients in the network, wherein the server performs the steps of:

storing permanent IDs of each of the clients, wherein each of the clients is granted a permanent ID that is mutually identifiable and permanent;

polling the clients from which an ACK or NACK has not been received after having transmitted file data to the clients by means of broadcast or multicast, wherein in a polling mode with non-receipt information, a packet for polling itself or notification of information prior to the polling is transmitted to the network by means of broadcast or multicast, wherein the packet contains permanent IDs of the clients that need reply to the polling, whereas in a polling mode with receipt information, a packet for polling itself or notification of information prior to the polling is transmitted to the network by means of broadcast or multicast, wherein the packet contains permanent IDs of the clients that need not reply to the polling;

detecting a number N of clients from which an ACK or NACK has not been received in response to the transmission of the file data from the server to the clients by means of broadcast or multicast; and switching between the polling mode with non-receipt information and the polling mode with receipt information based on the number N, and wherein the client performs the steps of:

storing its own permanent ID information;

determining whether or not to reply to the polling based on whether its own permanent ID is contained in the packet for polling itself or notification of information prior to the polling that has been received by means of broadcast or multicast; and based on the determination, replying or not replying to the server in response to the packet for polling received by means of broadcast or multicast.

Preferably, in the communication method for the network system according to the twenty-fourth aspect, the switching section determines, based on N, which makes the number of packets to be transmitted smaller, the polling mode with non-receipt information or the polling mode with receipt information, and based on the determination switches between the polling mode with non-receipt information and the polling mode with receipt information.

In a twenty-fifth aspect of the present invention, there is provided a communication method for a server in a network system that supports unicast as a communication scheme from a server to one client in a network, multicast as a communication scheme from the server to all the clients in a predetermined group, and broadcast as a communication scheme from the server to all the clients in the network, wherein the method comprises the steps of:

storing permanent IDs of each of the clients, wherein each of the clients is granted a permanent ID that is mutually identifiable and permanent;

polling the clients from which an ACK or NACK has not been received after having transmitted file data to the clients by means of broadcast or multicast, wherein in a polling mode with non-receipt information, a packet for polling itself or notification of information prior to the polling is transmitted to the network by means of broadcast or multicast, wherein the packet contains permanent IDs of the clients that need reply to the polling, whereas in a polling mode with receipt information, a packet for polling itself or notification of information prior to the polling is transmitted to the network by means of broadcast or multicast, wherein the packet contains permanent IDs of the clients that need not reply to the polling;

detecting a number N of clients from which an ACK or NACK has not been received in response to the transmission of the file data from the server to the clients by means of broadcast or multicast; and switching between the polling mode with non-receipt information and the polling mode with receipt information based on the number N.

Preferably, in the communication method for the network system according to the twenty-fifth aspect, the switching step determines, based on N, which makes the number of packets to be transmitted smaller, the polling mode with non-receipt information or the polling mode with receipt information, and based on the determination switches between the polling mode with non-receipt information and the polling mode with receipt information.

In a twenty-sixth aspect of the present invention, there is provided a communication method for clients in a network system that supports unicast as a communication scheme from a server to one client in a network, multicast as a communication scheme from the server to all the clients in a predetermined group, and broadcast as a communication scheme from the server to all the clients in the network, wherein the method comprises the steps of:

storing its own permanent ID information;

determining whether or not to reply to the polling based on whether its own permanent ID is contained in a packet for polling itself or notification of information prior to the polling that has been received by means of broadcast or multicast; and based on the determination, replying or not replying to the server in response to a packet for polling received by means of broadcast or multicast.

In a further aspect of the present invention, there are provided communication computer program products for a network system, which cause a computer to perform each of the steps of the communication methods for a network system according to the eighteenth, twenty-first, and twenty-fourth aspects of the present invention described above, respectively.

In a still further aspect of the present invention, there are provided communication computer program products for a server, which cause a computer to perform each of the steps of the communication methods for a server according to the nineteenth, twenty-second, and twenty-fifth aspects of the present invention, respectively.

In a yet further aspect of the present invention, there are provided communication computer program products for clients, which cause a computer to perform each of the steps of the communication methods for clients according to the twentieth, twenty-third, and twenty-sixth aspects of the present invention, respectively.

PREFERRED EMBODIMENT

Now the embodiment of the present invention will be described with reference to the accompanying drawings.

FIG. 1 depicts a schematic diagram of a broadcast type of data delivery system 10 utilizing the Internet. A server 11 and each client 12 are equipped with parabolic antennas 13, 14, respectively. Downstream data from server 11 to each client 12, such as the POLL, is carried by radio waves from the parabolic antenna 13 and then relayed by the communication satellite 15 to be sent to each of the parabolic antennas 14 distributed in a wide range of the country. On the contrary, upstream data from each client 12 to the server 11, such as an ACK/NACK, is sent from a modem 18 equipped for each client 12 to an Internet service provider (ISP) 19 via a public circuit or the like, and in turn sent to the server 11 via the Internet 21. The broadcast type of data delivery system 10 has excellent advantages for immediately delivering a large amount of data to a large number of clients 12.

FIG. 2 depicts hierarchies of the OSI (Open Systems Interconnection) reference standard. IP (Internet Protocol) belongs to the network layer, which is the third lowest layer of the OSI reference standard. UDP (User Datagram Protocol) and TCP (Transmission Control Protocol) belong to the transport layer, which is the fourth lowest layer of the OSI reference standard and constructed above the IP. RMTP (Reliable Multicast Transport Protocol), FTP (File Transport Protocol) and HTTP (Hypertext Transport Protocol) belong to the session and presentation layers, which are the fifth and sixth lowest layers of the OSI reference standard, wherein the RMTP is constructed above the UDP.

An IP address consists of 32 bits. A MAC (Media Access Control) address of the physical layer of the OSI reference standard, is a permanent and unique address for each hardware, while the IP address is dynamic. Each client 12 of FIG. 1 is granted an IP address by a DHCP (Dynamic Host Configuration Protocol) daemon upon login to the Internet. Each client 12 has also an IP address for the class D (multicast) that desires reception. Furthermore, each client is defined an IP address for broadcast by the LAN. That is, if the network address of the LAN is [9.68.59], then all the clients 12 connected to that LAN receive an IP address [9.68.59.255] by means of broadcast. An IP address of each client granted by the DHCP daemon is dynamic, whereas an IP addresses of class D for multicast and an IP address for broadcast are invariant and common to predetermined multiple clients 12. Each of the clients 12 can receive broadcast and multicast from the server 11 despite the change of their dynamic IP addresses.

FIG. 3 is a diagram illustrating a communication model of IP multicast. In server 11, RMTP implementation section 30 is located between the underlying lower protocol implementation section 35 and an upper application 36 and which has a message management section 31, multicast indication section 32 and MC (multicast) management table 33. On the other hand, in client 12, RMTP implementation section 38 is located between the underlying lower protocol implementation section 43 and an upper application 44 and which has a message management section 39, multicast indication section 40 and reception management table 41. IP is assumed to be able to implement multicast functions. As the lower protocols under the RMTP implementation sections 30 and 38, the UDPs and IPs of the lower protocol implementation section 35, 43 are utilized as the connectionless end-to-end datagram service, wherein replication of data packets, delivery to the group, and detection of bit errors (i.e., checksum) are performed. RMTP implementation sections 30, 38 utilize lower protocol implementation section 35, 43 to perform connection management, error recovery by means of retransmission, and confirmation of completion of the reception, as well as performing the one-way multicast from server 11 to multiple clients 12. RMTP implementation sections 30, 38 do not identify the upper applications 36, 44. MC management table 33 of server 11 shows the information about the relationship between the number of each packet of the file that is divided into multiple packets and delivered to each client 12 by means of multicast and the receipt of an ACK/NACK from each client 12. Reception management table 41 of client 12 shows the information about the relationship between the number of packet received from server 11 by means of multicast and validity of reception of the packet of that number.

FIG. 4 depicts a schematic block diagram of server 11 and client 12. Server 11 and client 12 comprises the same configuration despite the capacity and performance of each component are different. Namely, server 11 and client 12 comprises processing section 25 or 45 for performing various kinds of processing, storage section 26 or 46 for storing information about various kinds for processing performed by processing section 25 or 45, and packet transmission and reception section 27 or 47 for sending and receiving packets to and from the Internet 21, respectively. Message management section 31 of server 11 and storage section 46 of client 12 contain MC management table 33 and reception management table 41 shown in FIG. 3 as well as terminal ID database 28 and its own terminal ID management section 48 and others, respectively. Each client 12 is granted an IP address while connecting to the Internet 21 in an operating condition, however, the IP address is not permanent but changeable. On the contrary, each client 12 is granted a terminal ID that is permanent and mutually identifiable. Terminal ID database 28 of server 11 holds information about terminal IDs granted to all the clients of the group in which file delivery is performed by means of multicast. It is noted that terminal IDs are represented by text. The own terminal ID management section 48 of client 12 holds information about the terminal ID of client 12 itself.

FIG. 5 depicts conditions of file data sent from server 11 to multiple clients 12 and of an ACK/NACK sent from each client 12 to server 11. In FIG. 5, the passage of time is shown in the downward direction. One file data is carried on multiple data packets to be sent from server 11 to multiple clients 12 by means of multicast. When transmission of one file comes to an end, each client 12 sends an ACK/NACK to server 11 by means of unicast. In FIG. 5, each line that slopes down to the right represents transmission of data packets delivered from server 11 to clients 12 by means of multicast, while each line that slopes down to the left represents transmission of ACK/NACK packets sent from each client 12 to server 11 by means of unicast. It is noted that not only the ACK/NACK packets shown in FIG. 5 but also all the ACK/NACK packets shown in FIG. 9 and FIG. 10 (i.e., involved in client A, B, C) have a packet configuration as described below with reference to FIG. 7 and FIG.

8. Namely, a permanent ID information of client 12 that sends an ACK/NACK is described in the ACK/NACK packet, whereby server 11 can recognize properly which client 12 has sent the received ACK/NACK packet despite the change of the IP address of the client.

FIG. 6 depicts a format of data packet for RMTP. There are described in the data packet in order from the first byte, a numeral 1 representing data packet class, a packet length of this packet in bytes (16 bits), a connection ID (16 bit), and a sequence number of this packet (16 bits). Further described in the next bytes are flags in the former eight bits and the number of retransmission in the latter eight bits, thereafter user data follows. As the connection ID, a value used in the first request for connection establishment (CONN) is used for all the packets during the connection. The flags indicate whether it is another retransmission (BUSY transmission).

FIG. 7 depicts an extended format of an ACK packet for RMTP.

An ACK packet is transmitted by means of unicast. In the extended format of the ACK packet, the packet class is defined to be an extension 2, after which follows in order a packet length (16 bits), a connection ID (16 bit), the number of retransmission (8 bits), a name type (8 bits), a message ID (16 bits), reservation (16 bit), and a name ID (32 bits). The name type describes information about the size of the name ID. The name ID describes a permanent ID of client 12 that sends this ACK packet. In this way, server 11 reads data of the name ID in the ACK packet to identify the client 12 that has sent the ACK packet despite the change of the dynamic IP address of client 12.

FIG. 8 depicts an extended format of an NACK packet for RMTP. An NACK packet is transmitted by means of unicast. In the extended format of the NACK packet, the packet class is defined to be an extension 3, after which follows in order a packet length (16 bits), a connection ID (16 bit), the number of retransmission (8 bits), a name type (8 bits), a message ID (16 bits), reservation (16 bit), a name ID (32 bits), and finally a sequence number of a DT (data packet) that is necessary to be retransmitted (16 bits per sequence number). The name ID describes a permanent ID of client 12 that sends this NACK packet. In this way, server 11 reads data of the name ID in the NACK packet to identify the client 12 that has sent the NACK packet despite the change of the dynamic IP address of client 12. When receiving a NACK from each client 12, server 11 uses MC management table 33 to check up data packets whose sequence numbers correspond to those required to be retransmitted by at least one client 12, and then retransmits the data packets of those sequence numbers in order by means of multicast. The retransmission of the multicast is sent to all the clients 12, however, clients 12 that have already sent an ACK leaves and discard data. In this way, while the retransmission is performed multiple times, the number of data packets of the file that need to be retransmitted decreases, wherein the transmission of that file is terminated when the parabolic antenna 13 receives an ACK from the last client 12 remaining as a destination of retransmission or the number of retransmission reaches a predetermined number of times.

FIG. 9 is a diagram illustrating a first processing method for coping with the disappearance of an ACK/NACK. Three clients A, B and C are assumed as client 12. One file data is divided into multiple data packets and sent from server 11 to clients 12 by means of multicast. On the other hand, an ACK/NACK packet is transmitted from each client 12 to server 11 by means of unicast. Assuming that an ACK/NACK from clients A and B reaches server 11, while an ACK/NACK from client C to server 11 disappears on its way. If there is any client from which server 11 has not received an ACK/NACK within a predetermined period of time (e.g., several seconds in the case where several thousands of clients exist), server 11 sends a first polling packet by means of multicast. This first polling packet is shown as "POLL 1 (client C) multicast" in FIG. 9. The format of the first polling packet follows the packet formats shown in FIGS. 6 to 8, wherein there are described a polling class, permanent IDs of clients from which an ACK/NACK has not been received (hereinafter referred to as a "polling target client", for example, client C in the example shown in FIG. 9), and a connection ID (which matches the connection ID of data packet that has transmitted data of the file subject to polling), etc. The first polling packet sent from server 11 by means of multicast would reach all the clients of the group they belong to, however, clients whose permanent IDs are not described in the first polling packet should not reply to the polling with an ACK/NACK. On the contrary, clients whose permanent IDs are described in the first polling packet should reply to the polling with an ACK/NACK.

In this way, polling is informed from server 11 to the polling target clients, whereby a response can be required from the polling target clients to server 11 despite the fact that IP addresses of the polling target clients change.

In stead of the first polling packet, a second polling packet may be used. Hereinafter, a method for coping with disappearance of an ACK/NACK using the second polling packet is referred to as a second processing method. The second ACK packet is shown as "POLL 2 (client A, B) multicast" in FIG. 9. In the second polling packet, permanent IDs of clients (hereinafter referred to as a non-polling target client, for example, clients A, B in the example shown in FIG. 9) from which an ACK/NACK has been received are described instead of polling target clients. The second polling packet sent from server 11 by means of multicast would reach all the clients of the group they belong to, however, clients whose permanent IDs are described in the second polling packet should not reply to the polling with an ACK/NACK. On the contrary, clients whose permanent IDs are not described in the second polling packet should reply to the polling with an ACK/NACK. In this way, with the second processing method as well, polling is informed from server 11 to the polling target clients, whereby a response can be required from the polling target clients to server 11 despite the fact that IP addresses of the polling target clients change.

In the example shown in FIG. 9, for simplicity of illustration, it is assumed that the polling target clients are client C only while non-polling target clients are two clients A, B, however, the numbers of both polling target clients and non-polling target clients would increase as the total number of clients increases to several thousands, for example. As the maximum size of the packets for RMTP is predefined, there might occur the case where permanent IDs of all the polling target clients can not be described within one polling packet. In this case, whole information about the permanent IDs of the polling target clients and non-polling target clients may be transmitted from server 11 to clients 12 by means of multicast using multiple polling packets.

FIG. 10 is a diagram illustrating a third processing method for coping with the disappearance of an ACK/NACK. With regard to FIG. 10, only distinctions will be described omitting common points with FIG. 9. In this processing method, a receipt is defined as communication functions. The format of receipt packet follows the packet formats shown in FIGS. 6 to 8, including a class number meaning a receipt, permanent IDs of non-polling target clients (i.e., clients A, B in the example shown in FIG. 10), a connection ID, etc. The receipt packet sent from server 11 by means of multicast would reach all the clients of the group they belong to. As shown in FIG. 10, there is described "Receipt client A, B" in the receipt packet. The clients whose permanent IDs are described in the receipt packet are operationally set so as not to reply to the subsequent polling from server 11 with an ACK/NACK. On the contrary, the clients whose permanent IDs are not described in the receipt packet are operationally set so as to reply to the subsequent polling from server 11 with an ACK/NACK. After a predetermined time has passed since the receipt was issued, server 11 sends a second polling by means of multicast. The format of the second polling packet is slightly different from the aforementioned first polling packet. That is, according to the format of the second polling packet, the second polling packet includes a class meaning the second polling and a connection ID, but not including information about the polling target clients and non-polling target clients. In receipt of the second polling packet, the clients whose permanent IDs are not included in the receipt packet (i.e., client C in the example shown in FIG. 10) send an ACK/NACK to server 11 by means of unicast. In this way, with the third processing method as well, polling is informed from server 11 to the polling target clients, whereby a response can be required from the polling target clients to server 11 despite the fact that IP addresses of the polling target clients change.

In stead of the receipt packet, non-receipt packet may be used. Hereinafter, a method for coping with disappearance of an ACK/NACK using the non-receipt packet is referred to as a fourth processing method. The non-receipt packet is descried as "Non-receipt client C" in FIG. 10. Unlike the receipt packet, the non-receipt packet includes permanent IDs of the polling target clients (i.e., client C in the example shown in FIG. 10) in stead of the non-polling target clients. The non-receipt packet sent from server 11 by means of multicast would reach all the clients of the group they belong to, however, only the clients whose permanent IDs are described in the non-receipt packet should reply to the polling with an ACK/NACK. On the contrary, clients whose permanent IDs are not described in the non-receipt packet should not reply to the polling with an ACK/NACK. In this way, with the fourth processing method as well, polling is informed from server 11 to the polling target clients, whereby a response can be required from the polling target clients to server 11 despite the fact that IP addresses of the polling target clients change.

In the example shown in FIG. 10, for simplicity of illustration, it is assumed that the polling target clients are client C only while non-polling target clients are two clients A, B, however, the numbers of both polling target clients and non-polling target clients would increase as the total number of clients increases to several thousands, for example. As the maximum size of the packets for RMTP is predefined, there might occur the case where permanent IDs of all the non-polling target clients or polling target clients can not be described within one receipt packet or non-receipt packet, respectively. In this case, whole information about the permanent IDs of the non-polling or polling target clients may be transmitted from server 11 to clients 12 by means of multicast using multiple receipt or non-receipt packets, respectively.

Further, it will be described about a fifth to eighth processing methods for coping with the disappearance of an ACK/NACK. These methods attempt to reduce the network traffic and communication time by combining the aforementioned first to fourth processing methods. Now it is assumed that Na is the number of clients 12 that have not sent back an ACK/NACK to server 11, while Nb is the number of clients 12 that have sent back an ACK/NACK to server 11. According to the following combinations, a packet is to be used that transmits from server 11 to clients 12 the information concerning the lesser of either the polling target clients or non-polling target clients, thus the total number of packets sent from server 11 to clients 12 for polling by means of multicast decreases as well as the time required to send all the packets is also reduced.

The first combination for the fifth processing method:
When $Na \leq Nb$, the first processing method (i.e., the one that uses POLL 1 shown in FIG. 9) is used, while when $Na > Nb$, the second processing method (i.e., the one that uses POLL 2 shown in FIG. 9) is used.

The second combination for the sixth processing method:
When $Na \leq Nb$, the first processing method (i.e., the one that uses POLL 1 shown in FIG. 9) is used, while when $Na > Nb$, the third processing method (i.e., the one that uses Receipt shown in FIG. 10) is used.

The third combination for the seventh processing method:
When $Na \leq Nb$, the fourth processing method (i.e., the one that uses Non-receipt shown in FIG. 10) is used, while when $Na > Nb$, the second processing method (i.e., the one that uses POLL 2 shown in FIG. 9) is used.

The fourth combination for the eighth processing method:
When $Na \leq Nb$, the fourth processing method (i.e., the one that uses Non-receipt shown in FIG. 10) is used, while when $Na > Nb$, the third processing method (i.e., the one that uses Receipt shown in FIG. 10) is used.

FIG. 11 is a flowchart of a file transmission routine executed by server 11 for the first processing method. In step S50, a file is transmitted from server 11 to clients 12. As described above, for this transmission, file data is divided into multiple data packets and transmitted by means of multicast. In step S51, it is determined whether the file transmission has ended. If so, the processing proceeds to step S52. In step S52, a timer is set to measure the elapsed time. In step S53, it is determined whether a predetermined time has passed based on the measured time. If so, the processing proceeds to step S54. Server 11 would receive an ACK/NACK from each of the clients 12 within the elapsed time. In step S54, an investigation is made as to which clients 12 have not sent back an ACK/NACK. In step S55, based on the findings of step S54, the clients that have not replied are determined and then the polling with information about non-answering clients is sent by means of multicast.

Now the file transmission routine for the second processing method (that uses POLL 2 as shown in FIG. 9) is obtained by sending the polling with information about answering clients by means of multicast in stead of the polling with information about non-answering clients, in step S55 of the file transmission routine shown in FIG. 11.

FIG. 12 depicts principal parts of a flowchart of a file transmission routine executed by server 11 for the third processing method. As the routine is the same as that of FIG. 11 up to step S54, FIG. 12 only shows the steps thereafter. In step S57, based on the findings of step S54, the clients that have replied are determined and then the receipt with information about answering clients is sent by means of multicast. In step S58, the polling is sent by means of multicast. In response to the polling, the clients 12 whose permanent IDs are not contained in the receipt are to send back an ACK/NACK to server 11.

Now the file transmission routine for the fourth processing method (that uses Non-receipt as shown in FIG. 10) is obtained by sending the non-receipt with information about non-answering clients by means of multicast in stead of the polling with information about answering clients, in step S57 of the file transmission routine shown in FIG. 12.

FIG. 13 is a flowchart of a file transmission routine executed by server 11 for the fifth processing method. As the routine is the same as that of FIG. 11 up to step S54, FIG. 13 only shows the steps thereafter. In step S61, the number N of non-answering clients of an ACK/NACK are detected. Next in step S62, it is determined whether N is less than or equal to half of the total number of clients 12 subject to the file transmission of this time. If so, the processing proceeds to step S63, otherwise it proceeds to step S64. In step S63, the polling with information about non-answering clients (POLL 1 in FIG. 9) is sent by means of multicast. On the other hand, in step S64, the polling with information about answering clients (POLL 2 in FIG. 9) is sent by means of multicast. In this way, for a retransmission request for an ACK/NACK to non-answering clients, server 11 can notify the retransmission request to the non-answering clients with restraining the number of packets.

Now the file transmission routines for the aforementioned sixth to eighth processing methods (that uses Receipt or Non-receipt as shown in FIG. 10) are obtained by sending the non-receipt with information about non-answering clients by means of multicast in stead of the polling with information about non-answering clients, in step S63 in FIG. 13, or by sending the receipt with information about answering clients by means of multicast in stead of the polling with information about answering clients, in step S64 in FIG. 13.

FIG. 14 is a flowchart of a file reception routine executed by client 12 for the first processing method. In step S70, it is determined whether the polling with information about non-answering clients (POLL 1 shown in FIG. 9) has been received from server 11. If yes, the processing proceeds to step S71, otherwise the routine is terminated. In step S71, it is determined whether its own permanent ID is contained in the notified information received in step S70. If yes, the processing proceeds to step S72, otherwise the processing proceeds to step S73. In step S72, an ACK/NACK reply is sent back to server 11 by means of unicast. In step S73, no ACK/NACK reply is made.

Now the file reception routines for the aforementioned fourth and any of the fifth to eighth processing methods are obtained by determining whether the non-receipt with information about non-answering clients has been received in stead of the polling with information about non-answering clients in step S70 in FIG. 14, and then on receipt of the polling, sending an ACK/NACK reply in step S72 while making no ACK/NACK reply in step S73.

FIG. 15 is a flowchart of a file reception routine executed by client 12 for the second processing method. In step S78, it is determined whether the polling with information about answering clients (POLL 2 shown in FIG. 9) has been received from server 11. If yes, the processing proceeds to step S79, otherwise the routine is terminated. In step S79, it is determined whether its own permanent ID is contained in the notified information received in step S78. If yes, the processing proceeds to step S80, otherwise the processing proceeds to step S81. In step S80, no ACK/NACK reply is made, while an ACK/NACK reply is sent back to server 11 by means of unicast in step S81.

Now the file reception routines for the aforementioned third and any of the fourth to eighth processing methods are obtained by determining whether the receipt with information about answering clients has been received in stead of the polling with information about answering clients in step S78 in FIG. 15, and then on receipt of the polling, making no ACK/NACK reply to server 11 by means of unicast in step S80, whereas sending an ACK/NACK reply to server 11 by means of unicast in step S81.

BRIEF DESCRIPTION OF THE DRAWINGS

FIG. 7 depicts an extended format of an ACK packet for RMTP.

FIG. 8 depicts an extended format of an NACK packet for RMTP.

FIG. 11 is a flowchart of a file transmission routine executed by a server for the first processing method.

FIG. 12 depicts principal parts of a flowchart of a file transmission routine executed by a server for the third processing method.

DESCRIPTION OF THE SYMBOLS

Figure 1:
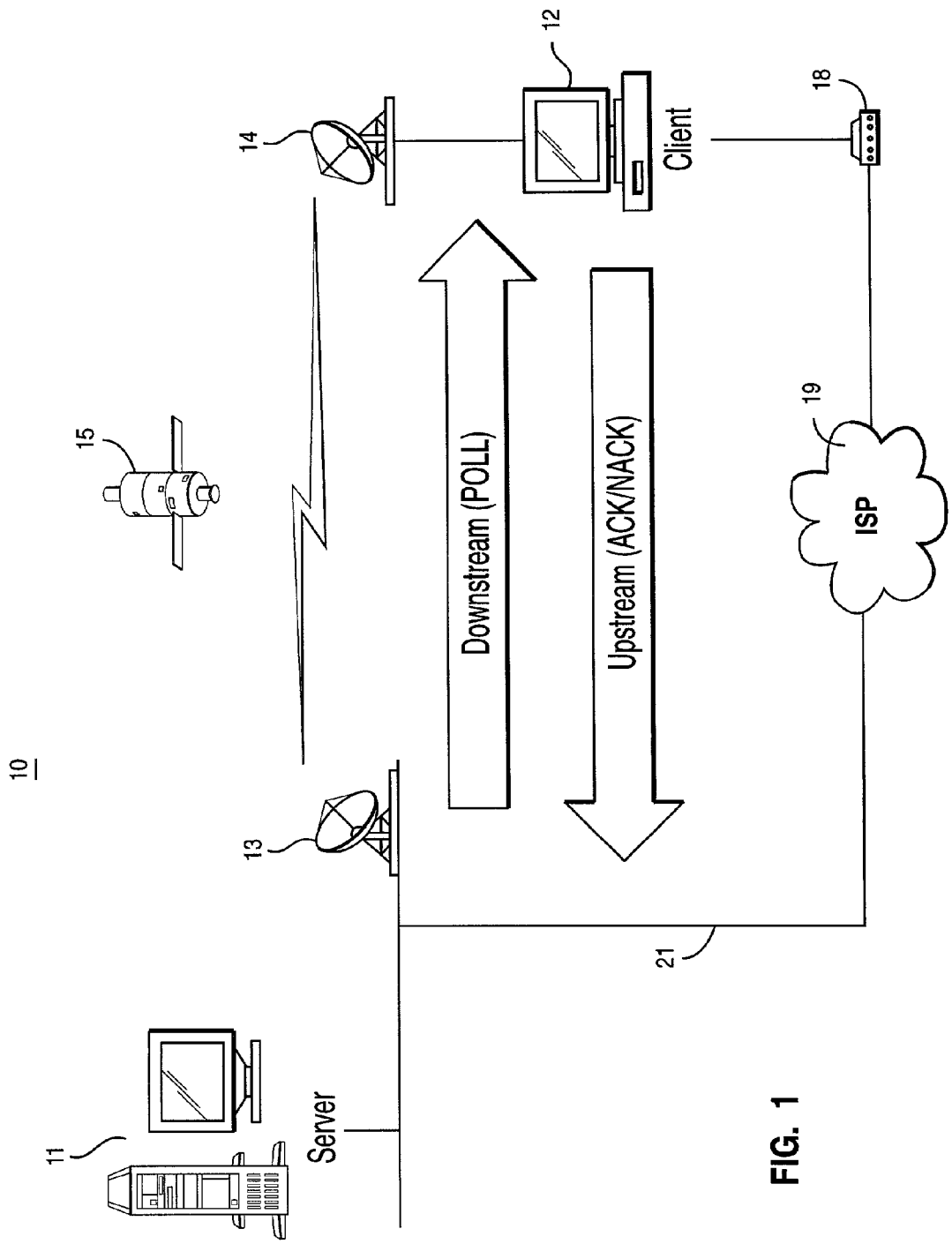
FIG. 1 depicts a schematic diagram of a broadcast type of data delivery system utilizing the Internet.
Figure 2:
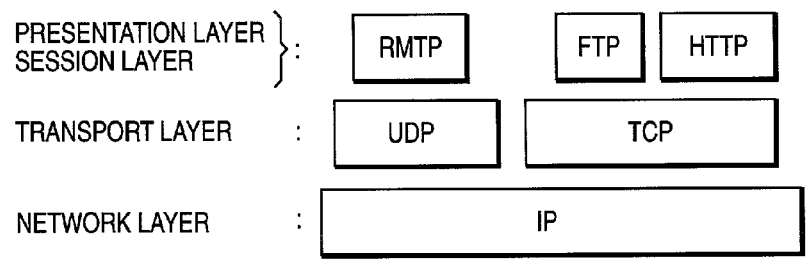
FIG. 2 depicts hierarchies of the OSI (Open Systems Interconnection) reference standard.
Figure 3:
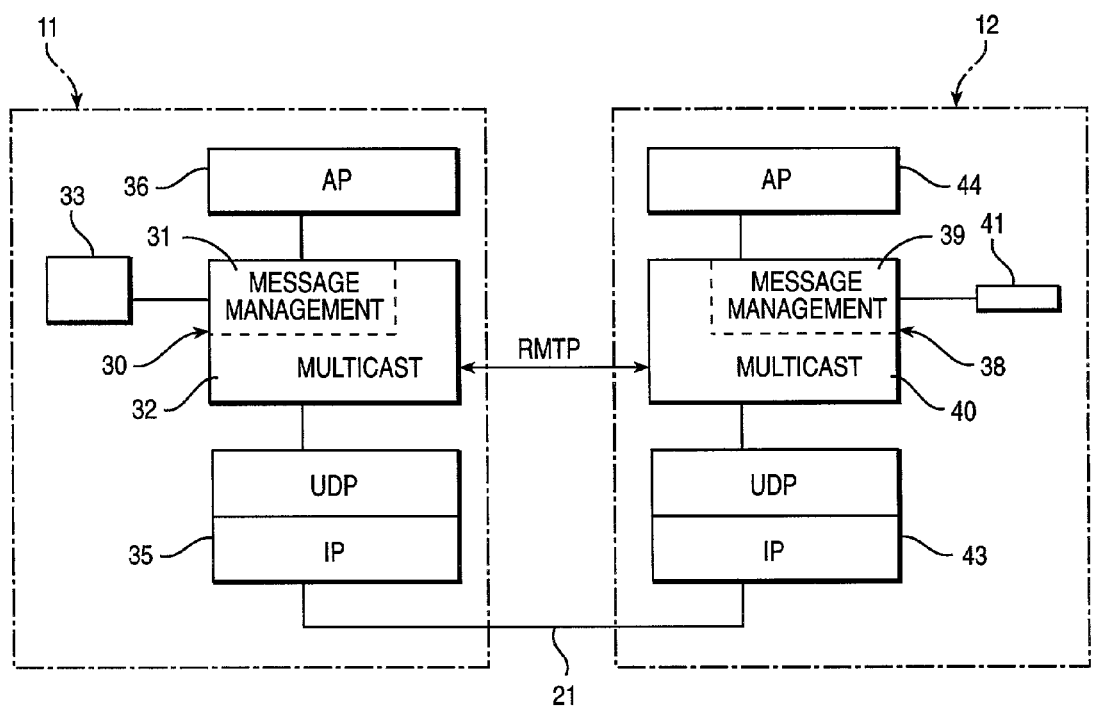
FIG. 3 is a diagram illustrating a communication model of IP multicast.
Figure 4:
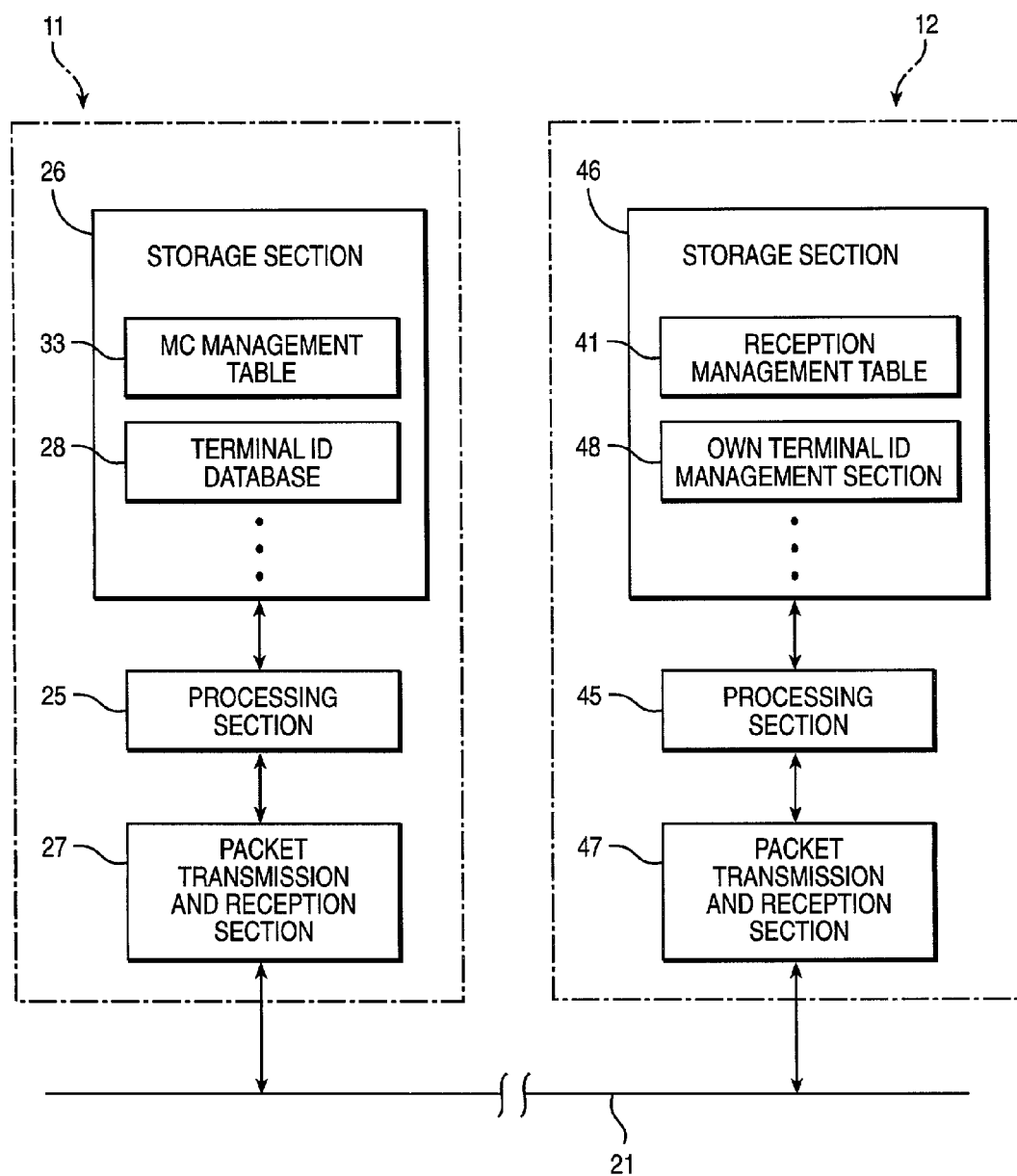
FIG. 4 depicts a schematic block diagram of a server and a client.
Figure 5:
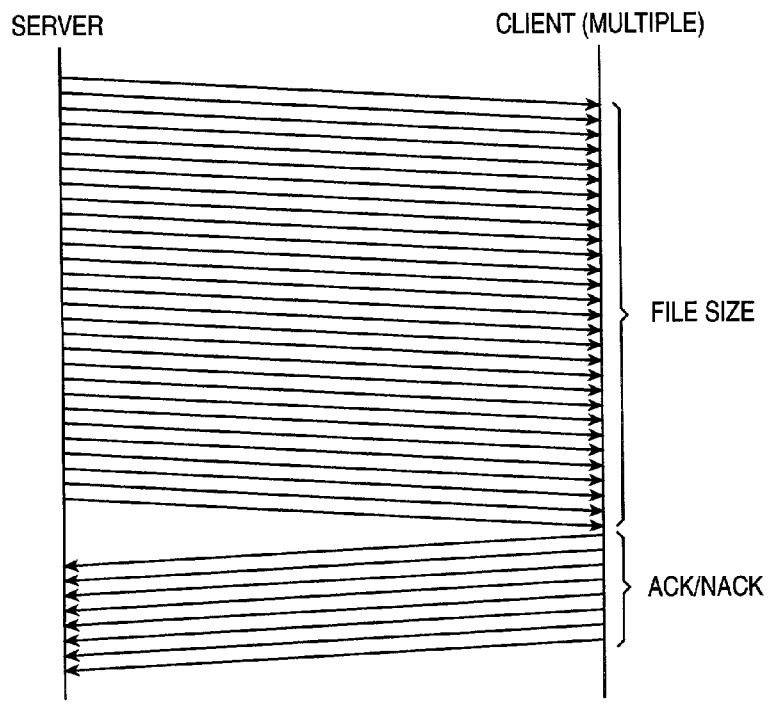
FIG. 5 depicts conditions of file data sent from a server to multiple clients and of an ACK/NACK sent from each client to the server.
Figure 6:
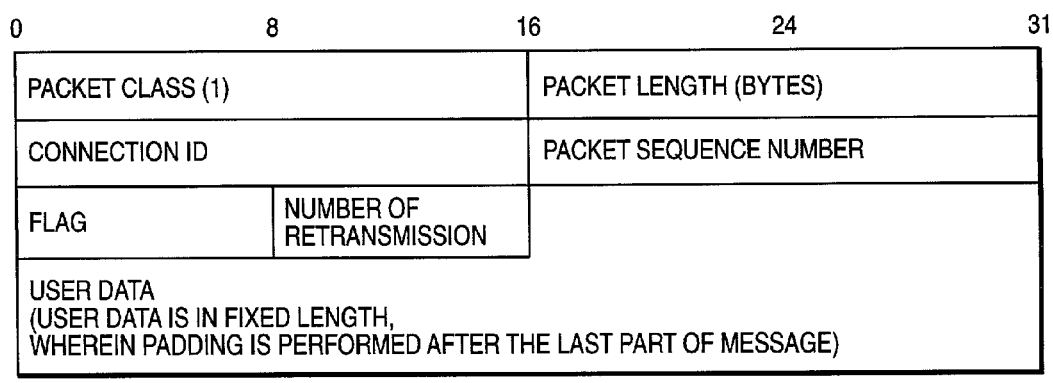
FIG. 6 depicts a format of data packet for RMTP.
Figure 9:
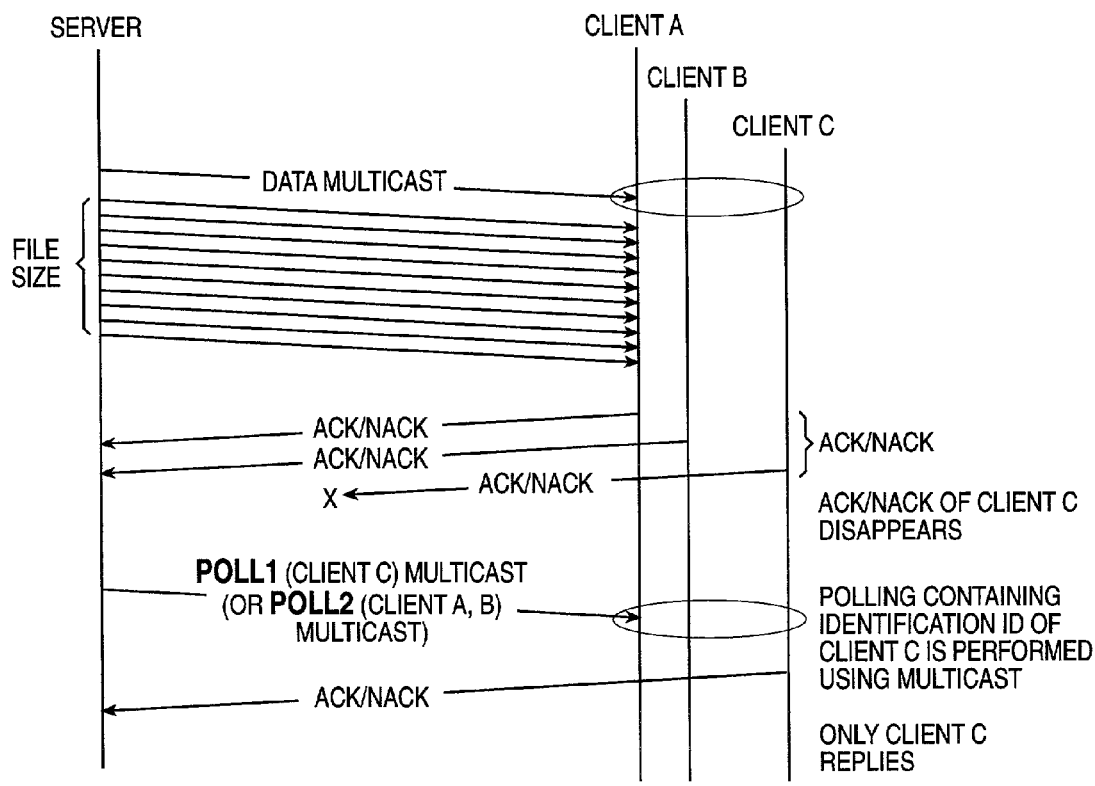
FIG. 9 is a diagram illustrating a first processing method for coping with the disappearance of an ACK/NACK.
Figure 10:
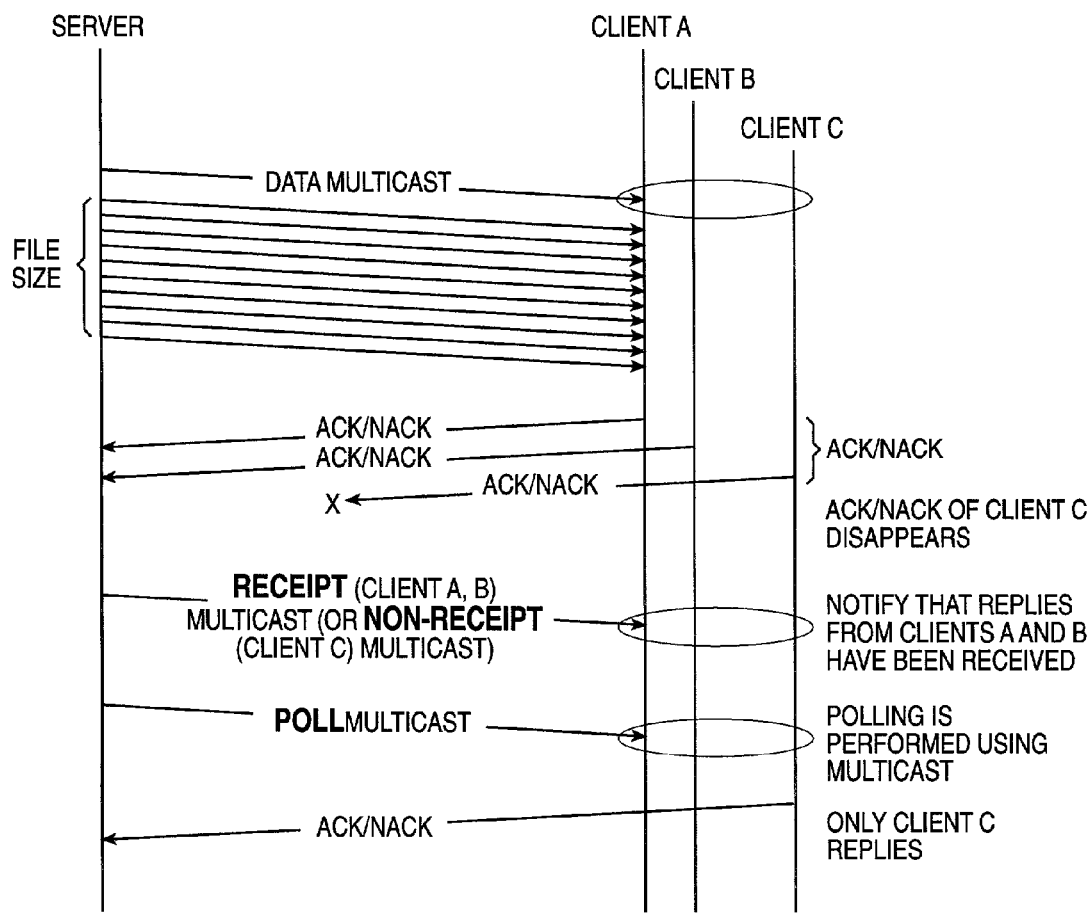
FIG. 10 is a diagram illustrating a third processing method for coping with the disappearance of an ACK/NACK.
Figure 13:
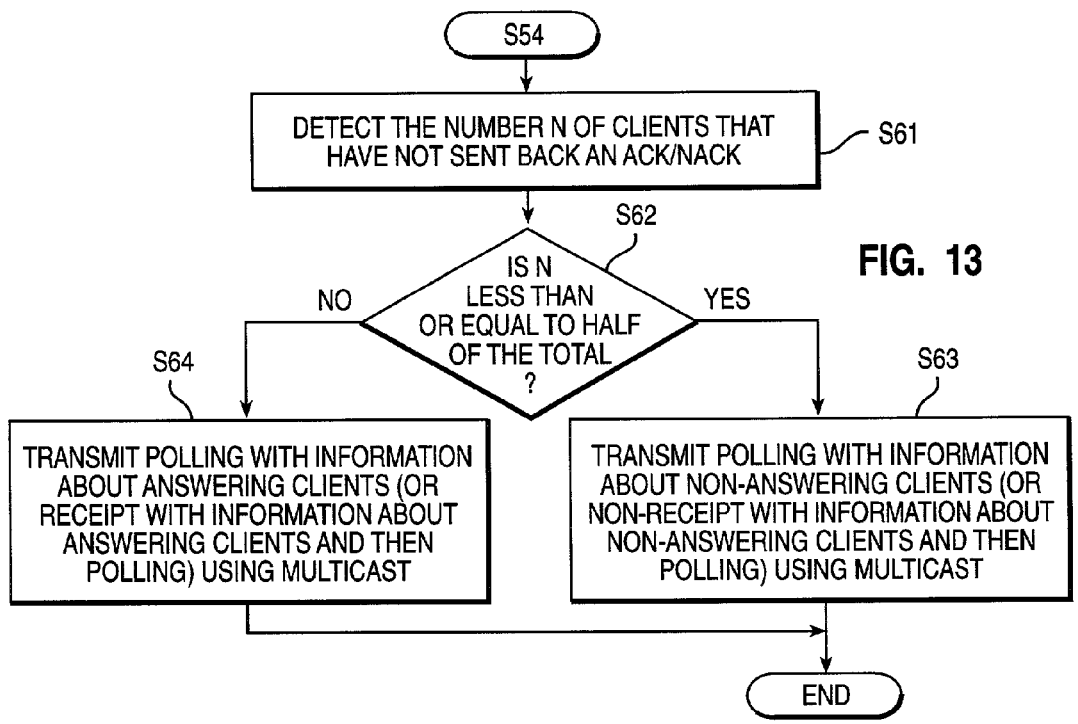
FIG. 13 is a flowchart of a file transmission routine executed by a server for the fifth processing method.
Figure 14:
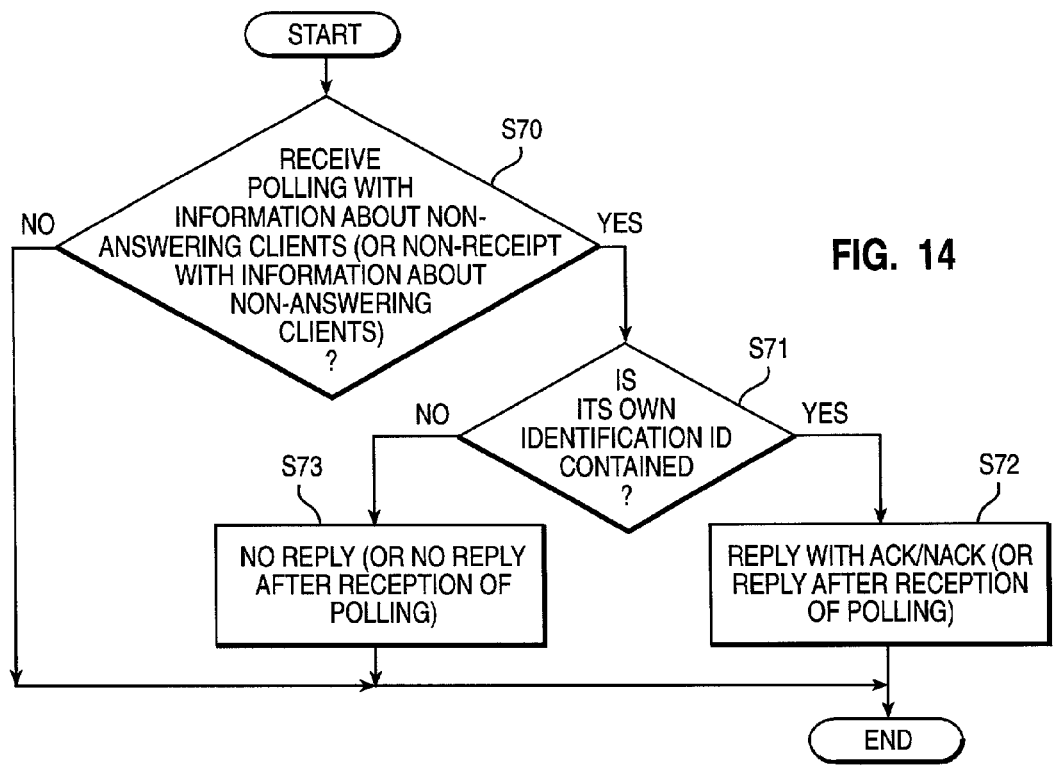
FIG. 14 is a flowchart of a file reception routine executed by a client for the first processing method.
Figure 15:
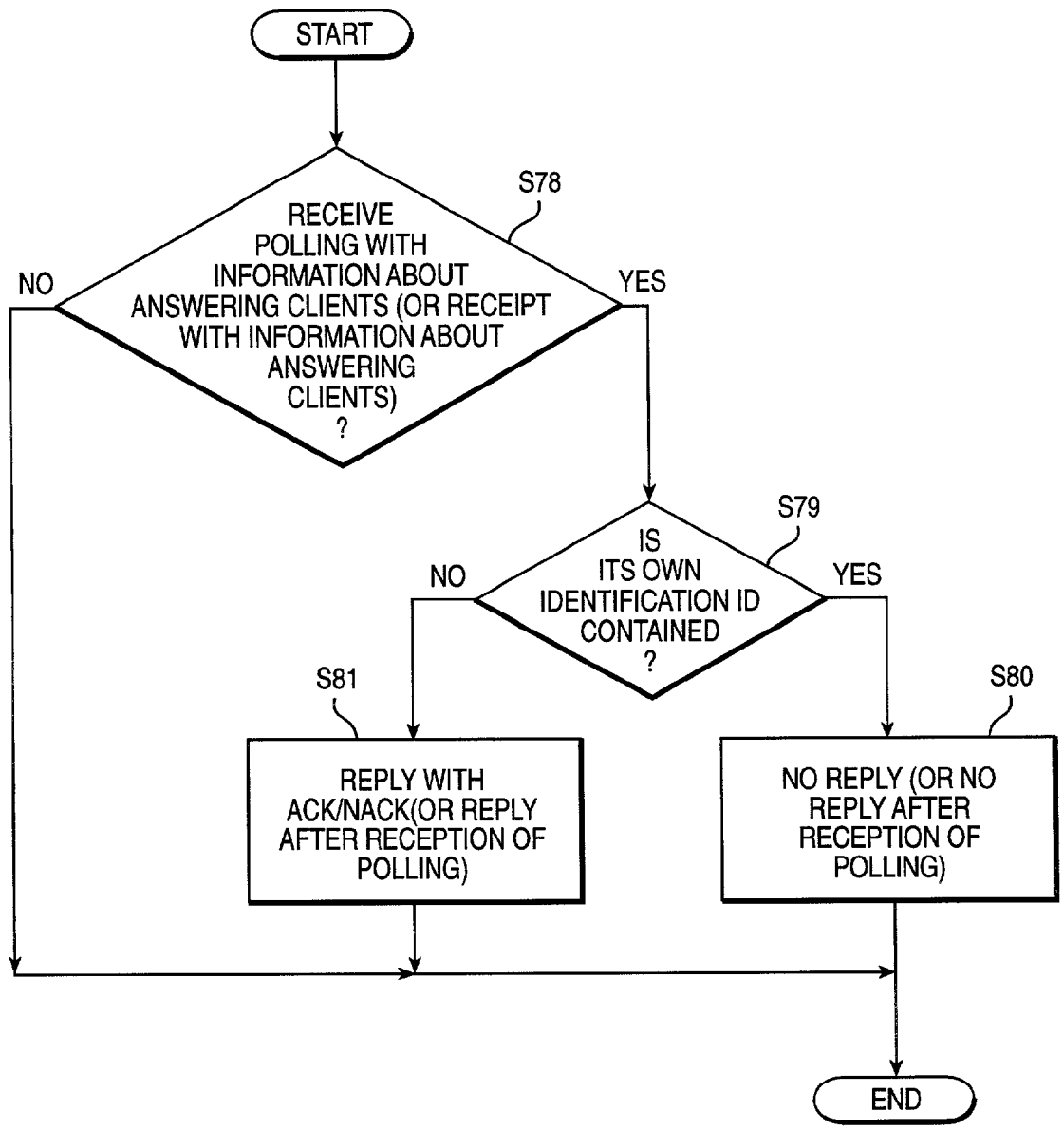
FIG. 15 is a flowchart of a file reception routine executed by a client for the second processing method.

10: Broadcast type of data delivery system (Network system)
11: Server
12: Client
21: Internet
25: Processing section
26: Storage section
27: Packet transmission and reception section
28: Terminal ID database
33: MC management table
41: Reception management table
45: Processing section
46: Storage section
47: Packet transmission and reception section
48: Own terminal ID management section

The invention claimed is:

1. A network system that supports unicast as a communication scheme from a server to one client in a network, multicast as a communication scheme from the server to all the clients in a predetermined group, and broadcast as a communication scheme from the server to all the clients in the network, wherein said server comprises:

a permanent ID information storage section for storing permanent IDs of each of the clients, wherein each of the clients is granted an unchangeable permanent ID in a textual representation that is mutually identifiable and permanent;

a polling transmission section for polling the clients from which an ACK or NACK has not been received after file data was transmitted to the clients by means of broadcast or multicast, wherein in a polling mode with non-receipt information, a packet for polling itself or notification of information prior to the polling is transmitted to said network by means of broadcast or multicast, wherein the packet contains permanent IDs of the clients that need reply to the polling, whereas in a polling mode with receipt information, a packet for polling itself or notification of information prior to the polling is transmitted to said network by means of broadcast or multicast, wherein the packet contains permanent IDs of the clients that need not reply to the polling;

a detection section for detecting a number N of clients from which an ACK or NACK has not been received in response to the transmission of the file data from the server to the clients by means of broadcast or multicast; and a switching section for switching between the polling mode with non-receipt information and the polling mode with receipt information in said polling transmission section based on the number N, and wherein said client comprises:

a permanent ID information storage section for storing its own permanent ID information;

a determination section for determining whether or not to reply to the polling based on whether its own permanent ID is contained in the packet for polling itself or notification of information prior to the polling that has been received by means of broadcast or multicast; and a reply section for replying or not replying to said server in response to the packet for polling received by means of broadcast or multicast based on the determination made by said determination section.

2. The network system according to claim 1, wherein the switching section determines, based on N, which makes the number of packets to be transmitted smaller, the polling mode with non-receipt information or the polling mode with receipt information, and based on the determination switches between the polling mode with non-receipt information and the polling mode with receipt information in said polling transmission section.

3. A server in a network system that supports unicast as a communication scheme from a server to one client in a network, multicast as a communication scheme from the server to all the clients in a predetermined group, and broadcast as a communication scheme from the server to all the clients in the network, comprising:

a permanent ID information storage section for storing permanent IDs of each of the clients, wherein each of the clients is granted an unchangeable permanent ID in a textual representation that is mutually identifiable and permanent;

a polling transmission section for polling the clients from which an ACK or NACK has not been received after file data was transmitted to the clients by means of broadcast or multicast, wherein in a polling mode with non-receipt information, a packet for polling itself or notification of information prior to the polling is transmitted to said network by means of broadcast or multicast, wherein the packet contains permanent IDs of the clients that need reply to the polling, whereas in a polling mode with receipt information, a packet for polling itself or notification of information prior to the polling is transmitted to said network by means of broadcast or multicast, wherein the packet contains permanent IDs of the clients that need not reply to the polling;

a detection section for detecting a number N of clients from which an ACK or NACK has not been received in response to the transmission of the file data from the server to the clients by means of broadcast or multicast; and a switching section for switching between the polling mode with non-receipt information and the polling mode with receipt information in said polling transmission section based on the number N.

4. The server according to claim 3, wherein said switching section determines, based on N, which makes the number of packets to be transmitted smaller, the polling mode with non-receipt information or the polling mode with receipt information, and based on the determination switches between the polling mode with non-receipt information and the polling mode with receipt information in said polling transmission section.

5. A communication method for a network system that supports unicast as a communication scheme from a server to one client in a network, multicast as a communication scheme from the server to all the clients in a predetermined group, and broadcast as a communication scheme from the server to all the clients in the network, wherein said server performs the steps of:

storing permanent IDs of each of the clients, wherein each of the clients is granted an unchangeable permanent ID in a textual representation that is mutually identifiable and permanent;

polling the clients from which an ACK or NACK has not been received after having transmitted file data to the clients by means of broadcast or multicast, wherein in a polling mode with non-receipt information, a packet for polling itself or notification of information prior to the polling is transmitted to said network by means of broadcast or multicast, wherein the packet contains permanent IDs of the clients that need reply to the polling, whereas in a polling mode with receipt information, a packet for polling itself or notification of information prior to the polling is transmitted to said network by means of broadcast or multicast, wherein the packet contains permanent IDs of the clients that need not reply to the polling;

detecting a number N of clients from which an ACK or NACK has not been received in response to the transmission of the file data from the server to the clients by means of broadcast or multicast; and switching between the polling mode with non-receipt information and the polling mode with receipt information based on the number N, and wherein said client performs the steps of:

storing its own permanent ID information;

determining whether or not to reply to the polling based on whether its own permanent ID is contained in the packet for polling itself or notification of information prior to the polling that has been received by means of broadcast or multicast; and based on the determination, replying or not replying to said server in response to the packet for polling received by means of broadcast or multicast.

6. A communication method for a server in a network system that supports unicast as a communication scheme from a server to one client in a network, multicast as a communication scheme from the server to all the clients in a predetermined group, and broadcast as a communication scheme from the server to all the clients in the network, comprising the steps of:

storing permanent IDs of each of the clients, wherein each of the clients is granted an unchangeable permanent ID in a textual representation that is mutually identifiable and permanent;

polling the clients from which an ACK or NACK has not been received after having transmitted file data to the clients by means of broadcast or multicast, wherein in a polling mode with non-receipt information, a packet for polling itself or notification of information prior to the polling is transmitted to said network by means of broadcast or multicast, wherein the packet contains permanent IDs of the clients that need reply to the polling, whereas in a polling mode with receipt information, a packet for polling itself or notification of information prior to the polling is transmitted to said network by means of broadcast or multicast, wherein the packet contains permanent IDs of the clients that need not reply to the polling;

detecting a number N of clients from which an ACK or NACK has not been received in response to the transmission of the file data from the server to the clients by means of broadcast or multicast; and switching between the polling mode with non-receipt information and the polling mode with receipt information based on the number N.

7. A communication computer program product comprising a computer useable medium having computer program code means recorded thereon for a network system that supports unicast as a communication scheme from a server to one client in a network, multicast as a communication scheme from the server to all the clients in a predetermined group, and broadcast as a communication scheme from the server to all the clients in the network, wherein the computer program code means causes said server computer to perform the steps of:

storing permanent IDs of each of the clients, wherein each of the clients is granted an unchangeable permanent ID in a textual representation that is mutually identifiable and permanent;

polling the clients from which an ACK or NACK has not been received after having transmitted file data to the clients by means of broadcast or multicast, wherein in a polling mode with non-receipt information, a packet for polling itself or notification of information prior to the polling is transmitted to said network by means of broadcast or multicast, wherein the packet contains permanent IDs of the clients that need reply to the polling, whereas in a polling mode with receipt information, a packet for polling itself or notification of information prior to the polling is transmitted to said network by means of broadcast or multicast, wherein the packet contains permanent IDs of the clients that need not reply to the polling;

detecting a number N of clients from which an ACK or NACK has not been received in response to the transmission of the file data from the server to the clients by means of broadcast or multicast; and switching between the polling mode with non-receipt information and the polling mode with receipt information based on the number N, and wherein the program causes said client computer to perform the steps of:

storing its own permanent ID information;

determining whether or not to reply to the polling based on whether its own permanent ID is contained in the packet for polling itself or notification of information prior to the polling that has been received by means of broadcast or multicast; and based on the determination, replying or not replying to said server in response to the packet for polling received by means of broadcast or multicast.

8. A communication computer program product comprising a computer useable medium having computer program code means recorded thereon for a server in a network system that supports unicast as a communication scheme from a server to one client in a network, multicast as a communication scheme from the server to all the clients in a predetermined group, and broadcast as a communication scheme from the server to all the clients in the network, wherein the computer program code means causes a server computer to perform the steps of:

storing permanent IDs of each of the clients, wherein each of the clients is granted an unchangeable permanent ID in a textual representation that is mutually identifiable and permanent;

polling the clients from which an ACK or NACK has not been received after having transmitted file data to the clients by means of broadcast or multicast, wherein in a polling mode with non-receipt information, a packet for polling itself or notification of information prior to the polling is transmitted to said network by means of broadcast or multicast, wherein the packet contains permanent IDs of the clients that need reply to the polling, whereas in a polling mode with receipt information, a packet for polling itself or notification of information prior to the polling is transmitted to said network by means of broadcast or multicast, wherein the packet contains permanent IDs of the clients that need not reply to the polling;

detecting a number N of clients from which an ACK or NACK has not been received in response to the transmission of the file data from the server to the clients by means of broadcast or multicast; and switching between the polling mode with non-receipt information and the polling mode with receipt information based on the number N.

* * * * *